United States Patent
Whitt et al.

(10) Patent No.: US 12,162,375 B2
(45) Date of Patent: Dec. 10, 2024

(54) SYSTEMS AND METHODS FOR DETERMINING ALLOCATION OF PERSONAL MOBILITY VEHICLES

(71) Applicant: Lyft, Inc., San Francisco, CA (US)

(72) Inventors: Carlos Ellis Whitt, San Francisco, CA (US); Steven James Martisauskas, San Francisco, CA (US); Dor Levi, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 1244 days.

(21) Appl. No.: 16/175,723

(22) Filed: Oct. 30, 2018

(65) Prior Publication Data

US 2019/0378055 A1     Dec. 12, 2019

Related U.S. Application Data

(60) Provisional application No. 62/681,661, filed on Jun. 6, 2018.

(51) Int. Cl.
*B60L 58/13*     (2019.01)
*B60Q 1/34*     (2006.01)
(Continued)

(52) U.S. Cl.
CPC .............. *B60L 58/13* (2019.02); *B60Q 1/346* (2013.01); *B60Q 1/444* (2013.01); *B60R 25/245* (2013.01);
(Continued)

(58) Field of Classification Search
None
See application file for complete search history.

(56) References Cited

U.S. PATENT DOCUMENTS

| 7,356,405 | B1 | 4/2008 | Nesbit |
| 7,627,422 | B2 | 12/2009 | Adamczyk |

(Continued)

FOREIGN PATENT DOCUMENTS

| CN | 104217583 A | 12/2014 |
| CN | 104699686 A | 6/2015 |

(Continued)

OTHER PUBLICATIONS

J. Schuijbroek, Inventory rebalancing and vehicle routing in bike sharing systems, Aug. 17, 2016 (Year: 2016).*

(Continued)

*Primary Examiner* — Resha Desai
*Assistant Examiner* — Ismail A Manejwala
(74) *Attorney, Agent, or Firm* — Baker Botts L.L.P.

(57) ABSTRACT

The disclosed computer-implemented method may include determining the allocation of personal mobility vehicles. By monitoring personal mobility vehicles and determining, based on sensor data from the personal mobility vehicles, the current usage status of the personal mobility vehicles, a dynamic transportation matching system may improve the user experience of transportation requestors relinquishing custody of personal mobility vehicles. In addition, the dynamic transportation matching system may reduce transfer time between personal mobility vehicles and other modes of transportation and/or may improve the availability of personal mobility vehicles across a dynamic transportation network. Various other methods, systems, and computer-readable media are also disclosed.

20 Claims, 12 Drawing Sheets

(51) Int. Cl.
| | |
|---|---|
| *B60Q 1/44* | (2006.01) |
| *B60R 25/24* | (2013.01) |
| *B60W 10/08* | (2006.01) |
| *B60W 10/18* | (2012.01) |
| *B60W 10/20* | (2006.01) |
| *B60W 10/30* | (2006.01) |
| *B60W 50/12* | (2012.01) |
| *G01C 21/20* | (2006.01) |
| *G01C 21/34* | (2006.01) |
| *G06Q 10/02* | (2012.01) |
| *G06Q 50/40* | (2024.01) |
| *G06V 20/56* | (2022.01) |
| *G07C 5/00* | (2006.01) |
| *G07C 5/08* | (2006.01) |
| *G07C 9/25* | (2020.01) |
| *G08G 1/01* | (2006.01) |
| *G08G 1/16* | (2006.01) |
| *H04W 4/029* | (2018.01) |
| *H04W 4/40* | (2018.01) |

(52) U.S. Cl.
CPC ............ *B60W 10/08* (2013.01); *B60W 10/18* (2013.01); *B60W 10/20* (2013.01); *B60W 10/30* (2013.01); *B60W 50/12* (2013.01); *G01C 21/20* (2013.01); *G01C 21/3415* (2013.01); *G01C 21/3423* (2013.01); *G01C 21/3438* (2013.01); *G01C 21/3461* (2013.01); *G01C 21/3492* (2013.01); *G06Q 10/02* (2013.01); *G06Q 50/40* (2024.01); *G06V 20/588* (2022.01); *G07C 5/004* (2013.01); *G07C 5/008* (2013.01); *G07C 5/0808* (2013.01); *G07C 9/25* (2020.01); *G08G 1/0125* (2013.01); *G08G 1/163* (2013.01); *G08G 1/165* (2013.01); *H04W 4/029* (2018.02); *H04W 4/40* (2018.02); *B60R 2325/205* (2013.01); *B60W 2300/365* (2013.01); *B60W 2510/244* (2013.01); *B60W 2552/00* (2020.02); *B60W 2552/15* (2020.02); *B60W 2710/086* (2013.01); *B60W 2710/18* (2013.01); *B60W 2710/20* (2013.01); *B60W 2710/30* (2013.01); *B60W 2720/10* (2013.01); *B62K 2202/00* (2013.01)

(56) References Cited

U.S. PATENT DOCUMENTS

| | | |
|---|---|---|
| 9,611,002 B1 | 4/2017 | Shum |
| 10,029,683 B1 | 7/2018 | Ginther |
| 10,036,641 B1 | 7/2018 | Iland |
| 10,346,772 B2 | 7/2019 | Mahmud |
| 10,584,971 B1 | 3/2020 | Askeland |
| 10,684,132 B2 | 6/2020 | Johnston |
| 10,828,999 B1 | 11/2020 | Konrardy |
| 11,117,488 B2 | 9/2021 | Whitt |
| 11,135,941 B2 | 10/2021 | Whitt |
| 11,186,200 B2 | 11/2021 | Whitt |
| 11,279,256 B2 | 3/2022 | Whitt |
| 11,285,840 B2 | 3/2022 | Whitt |
| 11,386,168 B2 | 7/2022 | Ricci |
| 11,400,830 B2 | 8/2022 | Whitt |
| 11,807,131 B2 | 11/2023 | Whitt |
| 2003/0177062 A1 | 9/2003 | Chen |
| 2008/0014908 A1 | 1/2008 | Vasant |
| 2008/0122605 A1 | 5/2008 | Tengler et al. |
| 2009/0069977 A1 | 3/2009 | Markyvech |
| 2010/0036599 A1 | 2/2010 | Froeberg |
| 2010/0042314 A1 | 2/2010 | Vogt |
| 2010/0057358 A1 | 3/2010 | Winer |
| 2010/0308984 A1 | 12/2010 | Ehrlich |
| 2011/0133918 A1 | 6/2011 | Lee et al. |
| 2012/0143401 A1 | 6/2012 | Jayadevappa et al. |
| 2012/0232787 A1 | 9/2012 | Kunath |
| 2013/0046456 A1 | 2/2013 | Scofield et al. |
| 2013/0173146 A1 | 7/2013 | Atmur et al. |
| 2013/0231824 A1 | 9/2013 | Wilson |
| 2014/0074392 A1 | 3/2014 | Holm |
| 2015/0074004 A1 | 3/2015 | Song |
| 2015/0092056 A1 | 4/2015 | Rau et al. |
| 2015/0305426 A1 | 10/2015 | Lee et al. |
| 2015/0314755 A1 | 11/2015 | Phelan |
| 2016/0034845 A1 | 2/2016 | Hiyama |
| 2016/0069696 A1 | 3/2016 | Salowitz |
| 2016/0131492 A1 | 5/2016 | Sheha et al. |
| 2016/0144928 A1 | 5/2016 | Chun |
| 2016/0231129 A1 | 8/2016 | Erez |
| 2016/0306350 A1 | 10/2016 | Shim et al. |
| 2016/0320198 A1 | 11/2016 | Liu |
| 2016/0368492 A1 | 12/2016 | Al-Stouhi |
| 2017/0004712 A1 | 1/2017 | Yang |
| 2017/0011324 A1 | 1/2017 | Truong |
| 2017/0030728 A1 | 2/2017 | Baglino et al. |
| 2017/0053209 A1 | 2/2017 | Céret |
| 2017/0146354 A1 | 5/2017 | Boss |
| 2017/0160094 A1 | 6/2017 | Zhang |
| 2017/0167882 A1 | 6/2017 | Ulloa |
| 2017/0178035 A1* | 6/2017 | Grimm ............... B60R 25/241 |
| 2017/0191845 A1 | 7/2017 | Marueli et al. |
| 2017/0225742 A1 | 8/2017 | Hancock |
| 2017/0236415 A1 | 8/2017 | Okabe et al. |
| 2017/0243492 A1 | 8/2017 | Lambert et al. |
| 2017/0314945 A1 | 11/2017 | König |
| 2017/0328725 A1 | 11/2017 | Schlesinger |
| 2017/0357914 A1 | 12/2017 | Tulabandhula |
| 2017/0364995 A1 | 12/2017 | Yan |
| 2018/0010915 A1 | 1/2018 | Wilhelm |
| 2018/0018840 A1 | 1/2018 | Xia et al. |
| 2018/0089605 A1 | 3/2018 | Poornachandran |
| 2018/0094943 A1 | 4/2018 | Grochocki |
| 2018/0096445 A1 | 4/2018 | Eyler et al. |
| 2018/0109764 A1 | 4/2018 | Schofield |
| 2018/0114258 A1* | 4/2018 | Ross ............... G01C 21/3492 |
| 2018/0118106 A1 | 5/2018 | You |
| 2018/0134289 A1 | 5/2018 | Kokido |
| 2018/0194349 A1 | 7/2018 | McGill |
| 2018/0211337 A1 | 7/2018 | Ghaddar |
| 2018/0356235 A1 | 12/2018 | Jang |
| 2019/0005412 A1 | 1/2019 | Matus |
| 2019/0049968 A1 | 2/2019 | Dean |
| 2019/0130318 A1 | 5/2019 | Lee |
| 2019/0146509 A1 | 5/2019 | Dean |
| 2019/0178672 A1 | 6/2019 | Woolley |
| 2019/0228466 A1 | 7/2019 | Kojima |
| 2019/0248439 A1 | 8/2019 | Wang |
| 2019/0304204 A1 | 10/2019 | Gao |
| 2019/0324446 A1* | 10/2019 | VanderZanden ..... G05D 1/0291 |
| 2019/0360818 A1 | 11/2019 | Linder |
| 2019/0383627 A1 | 12/2019 | Nangeroni |
| 2020/0064147 A1 | 2/2020 | Sliney |
| 2020/0130771 A1 | 4/2020 | Jacobsz |
| 2020/0151611 A1 | 5/2020 | McGavran |
| 2020/0276990 A1 | 9/2020 | Lequio |
| 2021/0146884 A1* | 5/2021 | Wang ............... B60R 25/245 |

FOREIGN PATENT DOCUMENTS

| | | |
|---|---|---|
| CN | 105809087 A | 7/2016 |
| DE | 102013222421 A1 | 5/2014 |
| EP | 2034451 A1 | 3/2009 |
| EP | 2 573 720 A1 | 3/2013 |
| EP | 3 188 141 A1 | 7/2017 |
| JP | 2008-037167 A | 2/2008 |
| JP | 2015-060452 A | 3/2015 |
| KR | 97-69562 A | 11/1997 |
| KR | 10-2012-0092361 A | 8/2012 |
| WO | 2017/194416 A1 | 11/2017 |
| WO | WO 2017214964 A1 | 12/2017 |
| WO | 2018/079590 A1 | 5/2018 |

(56) References Cited

FOREIGN PATENT DOCUMENTS

OTHER PUBLICATIONS

Whitt et al., "Systems and Methods for Matching Transportation Requests to Personal Mobility Vehicles", U.S. Appl. No. 16/207,002, filed Nov. 30, 2018, 83 pages.

Whitt et al., "Systems and Methods for Routing Personal Mobility Vehicles Based on Road Conditions", U.S. Appl. No. 16/235,699, filed Dec. 28, 2018, 66 pages.

Whitt et al., "Systems and Methods for Battery-Driven Personal Mobility Vehicle Management in Dynamic Transportation Networks", U.S. Appl. No. 16/179,788, filed Nov. 2, 2018, 68 pages.

Whitt et al., "Apparatuses, Systems, and Methods for Increasing Safety in Personal Mobility Vehicle Operation", U.S. Appl. No. 16/181,325, filed Nov. 5, 2018, 81 pages.

Whitt et al., "Systems and Methods for Transport Completion Using Lane-Constrained Vehicles and Personal Mobility Vehicles", U.S. Appl. No. 16/206,999, filed Nov. 30, 2018, 99 pages.

Whitt et al., "Systems and Methods for Automated Signaling for Networked Personal Mobility Vehicles", U.S. Appl. No. 16/235,707, filed Dec. 28, 2018, 58 pages.

International Search Report and Written Opinion for International Application No. PCT/US2019/035665, 8 pages.

International Search Report and Written Opinion for International Application No. PCT/US2019/035001, 9 pages.

International Search Report and Written Opinion for International Application No. PCT/US2019/035667, 10 pages.

International Search Report and Written Opinion for International Application No. PCT/US2019/035668, 10 pages.

International Search Report and Written Opinion for International Application No. PCT/US2019/035653, 10 pages.

International Search Report and Written Opinion for International Application No. PCT/US2019/035663, 9 pages.

Nilsson, et al., "Automated Highway Lane Changes of Long Vehicle Combinations: A Specific Comparison between Driver Model Based Control and Non-Linear Model Predictive Control," 2015 International Symposium on Innovations in Intelligent SysTems and Applications (INISTA) Sep. 2-4, 2015, added to IFEE Xplore on Sep. 28, 2015, 8 pages.

Lin, et al., "VShare: A Wireless Social Network Aided Vehicle Sharing System Using Hierarchical Cloud Architecture," May 16, 2016, 12 pages.

Choo, et al., "Reliable Vehicle Selection Algorithm with Dynamic Mobility of Vehicle in Vehicular Cloud System," APNOMS 2017, Nov. 2, 2017, 3 pages.

\* cited by examiner

SYSTEMS AND METHODS FOR DETERMINING ALLOCATION OF PERSONAL MOBILITY VEHICLES

CROSS REFERENCE TO RELATED APPLICATION

This application claims the benefit of U.S. Provisional Application No. 62/681,661, filed 6 Jun. 2018, the disclosure of which is incorporated, in its entirety, by this reference.

BACKGROUND

Some transportation services may provide transportation on demand, drawing from a transportation supply pool to meet the needs of those requesting transportation as the needs arise. In many examples, dynamic transportation matching service may attempt to provide a transportation requestor with a route to their destination that is efficient in terms of time, cost, or other constraints for both the transportation requestor and the dynamic transportation network. In some cases, a quicker or more efficient route to a destination may involve areas such as sidewalks and bicycle lanes that are off-limits to traditional roadgoing vehicles, such as cars and trucks. In other cases, it may be more efficient for a transportation requestor to travel a short distance to meet a transportation provider. Including personal mobility vehicles in a dynamic transportation network may enable transportation requestors to complete portions of a journey more efficiently. However, transferring custody of a personal mobility vehicle once a transportation requestor is finished with the vehicle may be a point of friction that may delay trips or increase user frustration. Accordingly, improving the ability of a dynamic transportation matching system to update the statuses of personal mobility vehicles may improve the efficiency and/or user experience for transportation requestors being transported by a dynamic transportation network.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
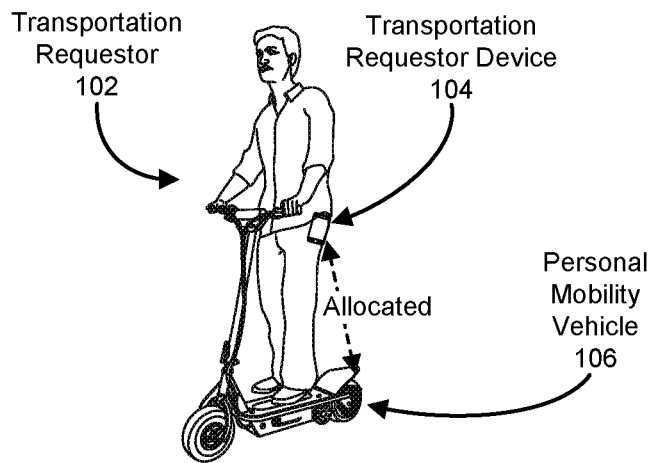
FIGS. 1A, 1B, and 1C are an illustration of an example transportation requestor, personal mobility vehicle, and unauthorized user.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to updating the statuses of personal mobility vehicles in response to changes in the current usage of the personal mobility vehicles. Requiring users to manually update the status of a personal mobility vehicle at the end of usage may inconvenience users, slow down transfers to additional modes of transportation and/or introduce the possibility of user error. By automatically updating the statuses of personal mobility vehicles in response to sensor data from the personal mobility vehicle and/or additional devices, a dynamic transportation matching system may increase the efficiency and convenience of personal mobility vehicles as part of users' trips and/or may more accurately reflect the current status of personal mobility vehicles that are part of a dynamic transportation network. Additionally, because in some embodiments users may be charged for the time spent with custody of personal mobility vehicles, automatically updating the status of personal mobility vehicles may decrease the cost of personal mobility vehicle use for users. In some embodiments, the systems and methods described herein may provide advantages to a dynamic transportation matching system by quickly and accurately updating the status of personal mobility vehicles that are associated with a dynamic transportation network managed by the dynamic transportation matching system, enabling the dynamic transportation matching system to perform more efficient and/or accurate calculations related to matching transportation requestors and/or transportation requestor devices with personal mobility vehicles. In some examples, the systems described herein may also provide advantages to a dynamic transportation matching system by reducing the transfer time of transportation requestors leaving a personal mobility vehicle and meeting a transportation provider.

Accordingly, as may be appreciated, the systems and methods described herein may improve the functioning of a computer that implements dynamic transportation matching. For example, these systems and methods may improve the functioning of the computer by improving dynamic transportation matching results. Furthermore, for the reasons mentioned above and to be discussed in greater detail below, the systems and methods described herein may provide advantages to dynamic transportation management and/or the field of transportation. In addition, these systems and methods may provide advantages to personal mobility vehicles (whether piloted by a human driver or autonomous) that operate as a part of a dynamic transportation network.

For example, the personal mobility vehicles may complete transportation tasks more efficiently (e.g., in terms of time spent idle versus time spent in use, etc.).

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that is associated with a dynamic transportation network (e.g., that is managed by, coordinated by, and/or drawn from by the dynamic transportation matching system to provide transportation to transportation requestors).

In some examples, available sources of transportation associated with a dynamic transportation network may include vehicles that are owned by an owner and/or operator of the dynamic transportation matching system. Additionally or alternatively, sources of transportation associated with a dynamic transportation network may include vehicles that are owned outside of the dynamic transportation network but that are associated with the dynamic transportation network by agreement. In some examples, the dynamic transportation network may include road-going vehicles (e.g., cars, light trucks, etc.). Furthermore, in some examples, as will be explained in greater detail below, the dynamic transportation network may include personal mobility vehicles.

As used herein, the term "personal mobility vehicle" (or "PMV") may refer to any of a variety of types of vehicles that may be smaller and/or lighter than traditional road-going and/or road-confined vehicles such as cars, trucks, and/or motorcycles. In some examples, a personal mobility vehicle may have fewer than four wheels. In some examples, personal mobility vehicles may be more flexible, maneuverable, and may be provided access to particular portions of a road way (e.g., bike lane, sidewalk, etc.) that traditional automobiles may not legally be able to access. Personal mobility vehicles may be human and/or motor powered and may have any suitable sized and/or powered motor to allow the personal mobility vehicle to travel any suitable speed and carry any suitable load. In some embodiments, without limitation, a personal mobility vehicle may operate with less than about five horsepower, less than about four horsepower, or less than about three horsepower. Notwithstanding the above examples, PMVs may operate at any suitable horsepower level (e.g., significantly higher horsepower levels). In various examples, without limitation, a personal mobility vehicle may weigh less than about 150 pounds, less than about 100 pounds, less than about 70 pounds, or less than about 50 pounds. Notwithstanding the above examples, PMVs may have any suitable weight. In various examples, without limitation, a personal mobility vehicle may operate at a maximum speed (e.g., absent downhill acceleration) of about 35 miles per hour or less, about 30 miles per hour or less, about 25 miles per hour or less, or about 20 miles per hour or less. Notwithstanding the above examples, PMVs may operate at any suitable speed (including, e.g., significantly higher speeds).

In some examples, a personal mobility vehicle may be designed to transport a single passenger. However, in some embodiments, the personal mobility vehicles may also transport more than a single passenger (e.g., a tandem bicycle). In some examples, a personal mobility vehicle may be partially or fully self-powered (e.g., through a combustion motor or an electric motor). In some examples, a personal mobility vehicle may be partially or fully human-powered. Examples of personal mobility vehicles include, without limitation, scooters, pedaled bicycles, electric bicycles, skateboards, unicycles, and self-balancing two-wheeled vehicles.

In some examples, a dynamic transportation matching system may match transportation requestors to personal mobility vehicles. For example, the dynamic transportation matching system may determine that a starting location of a transportation requestor is near an available personal mobility vehicle associated with the dynamic transportation network; provide, to the transportation requestor, directions to the personal mobility vehicle; and transmit instructions to the personal mobility vehicle to unlock and/or activate for the transportation requestor. The transportation requestor may then ride the personal mobility vehicle to a destination.

FIG. 1A illustrates an example transportation requestor 104 using a personal mobility vehicle 106. In some examples, personal mobility vehicle 106 may be allocated to transportation requestor 104 and/or a transportation requestor device 102 operated by transportation requestor 104 according to a dynamic transportation management system. For example, the dynamic transportation matching system may have matched personal mobility vehicle 106 to transportation requestor 104 and/or transportation requestor device 102 to fulfill all or part of a transportation request from transportation requestor 104 via transportation requestor device 102.

Figure 1B:
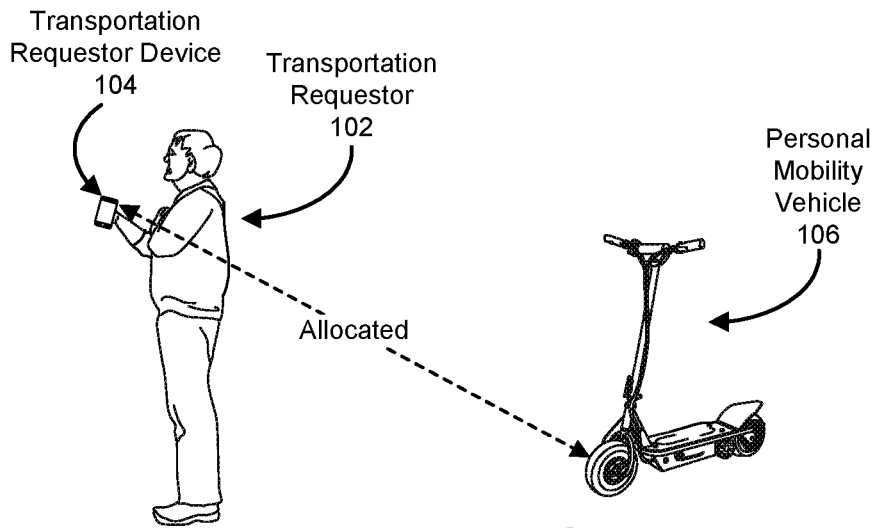

In some examples, as illustrated in FIG. 1B, transportation requestor 104 may have arrived at a destination and/or transfer point via personal mobility vehicle 106 and may no longer be using personal mobility vehicle 106. Manually relinquishing personal mobility device 106, such as by entering a code, securing a physical lock, and/or performing other actions may be inconvenient to transportation requestor 104 and/or may delay transportation requestor 104 from meeting an additional transportation provider. Additionally, relying on transportation requestor 104 to manually update the status of personal mobility vehicle 106 may cause the dynamic transportation matching system's information about the status of personal mobility vehicle 106 to be out of date if transportation requestor 104 fails to update the status of personal mobility vehicle 106 in a timely manner.

Figure 1C:
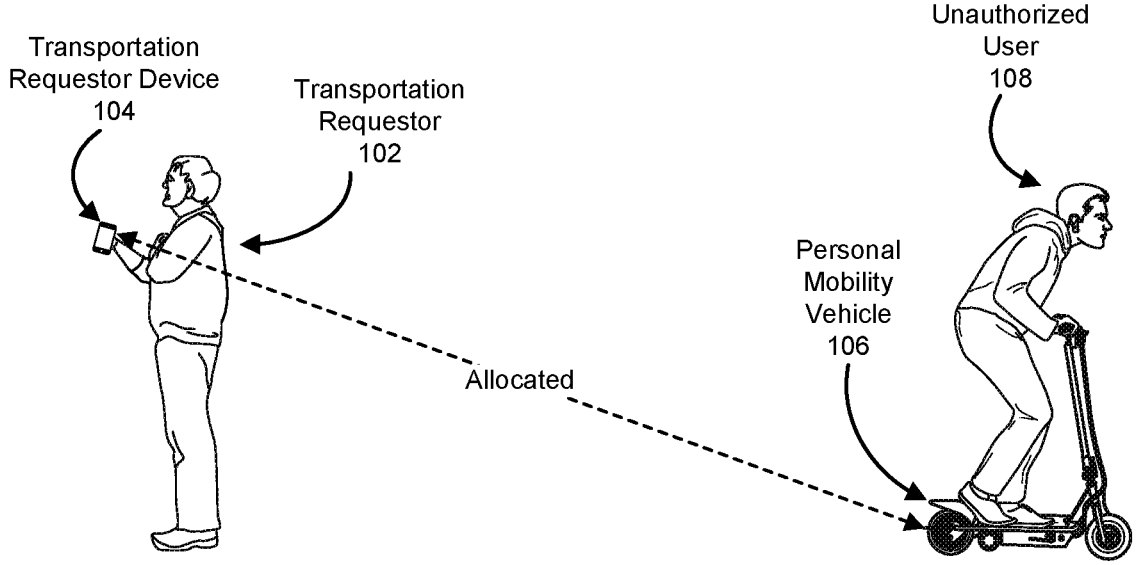

In one example, as illustrated in FIG. 1C, an unauthorized user 108 may attempt to use personal mobility vehicle 106 while personal mobility vehicle 106 is still assigned to transportation requestor 104 and/or transportation requestor device 102. In some examples, transportation requestor 104 may then be responsible for any usage of and/or damages caused to personal mobility vehicle 106 by unauthorized user 108 while personal mobility vehicle 106 remains assigned to transportation requestor 104. Therefore, the systems and methods described herein may automatically update the status of personal mobility vehicle 106 based on input from various devices and/or sensors without deliberate active intervention from transportation requestor 104.

Figure 2:
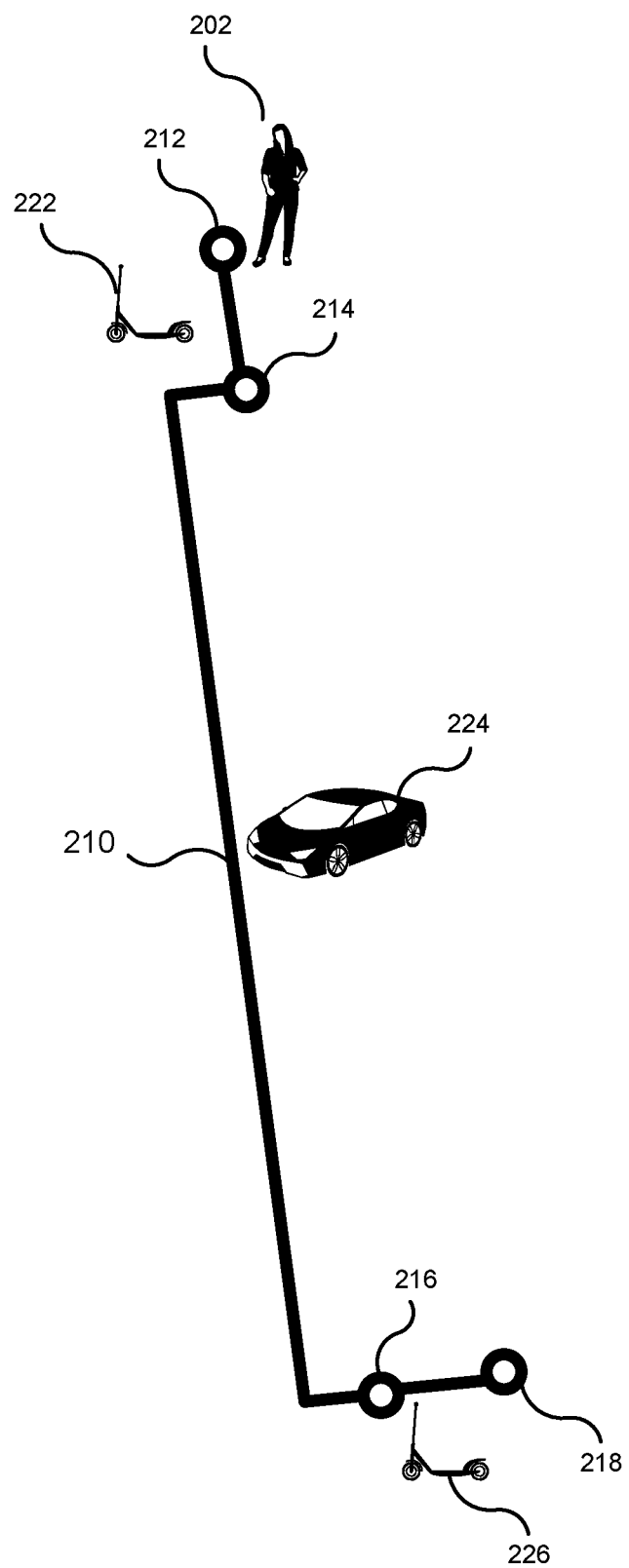
FIG. 2 is an illustration of an example trip.

FIG. 2 illustrates an example trip 210 arranged by a dynamic transportation matching system. As shown in FIG. 2, a requestor 202 may start trip 210 at a location 212 and ride a personal mobility vehicle such as scooter 222 from location 212 to location 214. Requestor 202 may then leave scooter 222 at location 214 and meet provider 224 (or, alternatively, scooter 222 may be loaded for transport by provider 224). Provider 224 may then transport requestor 202 from location 214 to location 216. Requestor 202 may then continue trip 210 from location 216 to location 218 on scooter 226 (which may be a scooter that was left and/or docked at location 214 or may be scooter 222 that was transported in vehicle 224).

In some examples, a dynamic transportation matching system 224 may match requestor 202 to scooters 222 and 226 for the beginning and the end of trip 210 to improve efficiencies for requestor 202, provider 224, and/or one or more requestors and/or providers associated with a dynamic transportation network. For example, the dynamic transportation matching system may determine that the leg from location 212 to 214 and/or the leg from location 216 to 218 may be inefficient for provider 224 (e.g., due to high traffic density, unsuitable roads for road-going vehicles, etc.). Additionally or alternatively, provider vehicle 224 may provide transportation to one or more additional requestors for part or all of the leg from location 214 to leg 210 and the dynamic transportation matching system may determine that directing requestor to arrive to location 214 by scooter 222 will reduce travel time for the additional requestors.

In some examples, the dynamic transportation matching system may arrange the multi-leg trip at the time of the transportation request by requestor 202. In some examples, the dynamic transportation matching system may dynamically change the trip while requestor 202 is en route to location 218. For example, the dynamic transportation matching system may initially direct provider 224 to transport requestor 202 from location 214 to location 218, but may later determine it would be more efficient for requestor 202, provider 224, and/or one or more additional requestors and/or providers associated with the dynamic transportation network for requestor 202 to be dropped off at location 216 and travel by scooter 226 to location 218. For example, the dynamic transportation matching system may determine that traffic is congested between locations 216 and 218 and requestor 202 and/or provider 224 would save time and/or expense by matching requestor 202 to scooter 226 at location 216. Accordingly, the dynamic transportation matching system may notify requestor 202 and/or provider 224 during trip 210 to arrange for the modification to trip 210. By automatically updating the status of scooter 222 and/or scooter 226 when requestor 202 is no longer using scooter 222 and/or scooter 226, the systems described herein may increase the efficiency of transfers between scooter 222 and provider 224 and/or improve the availability of scooter 222 and/or scooter 226 for additional transportation requestors.

Figure 3:
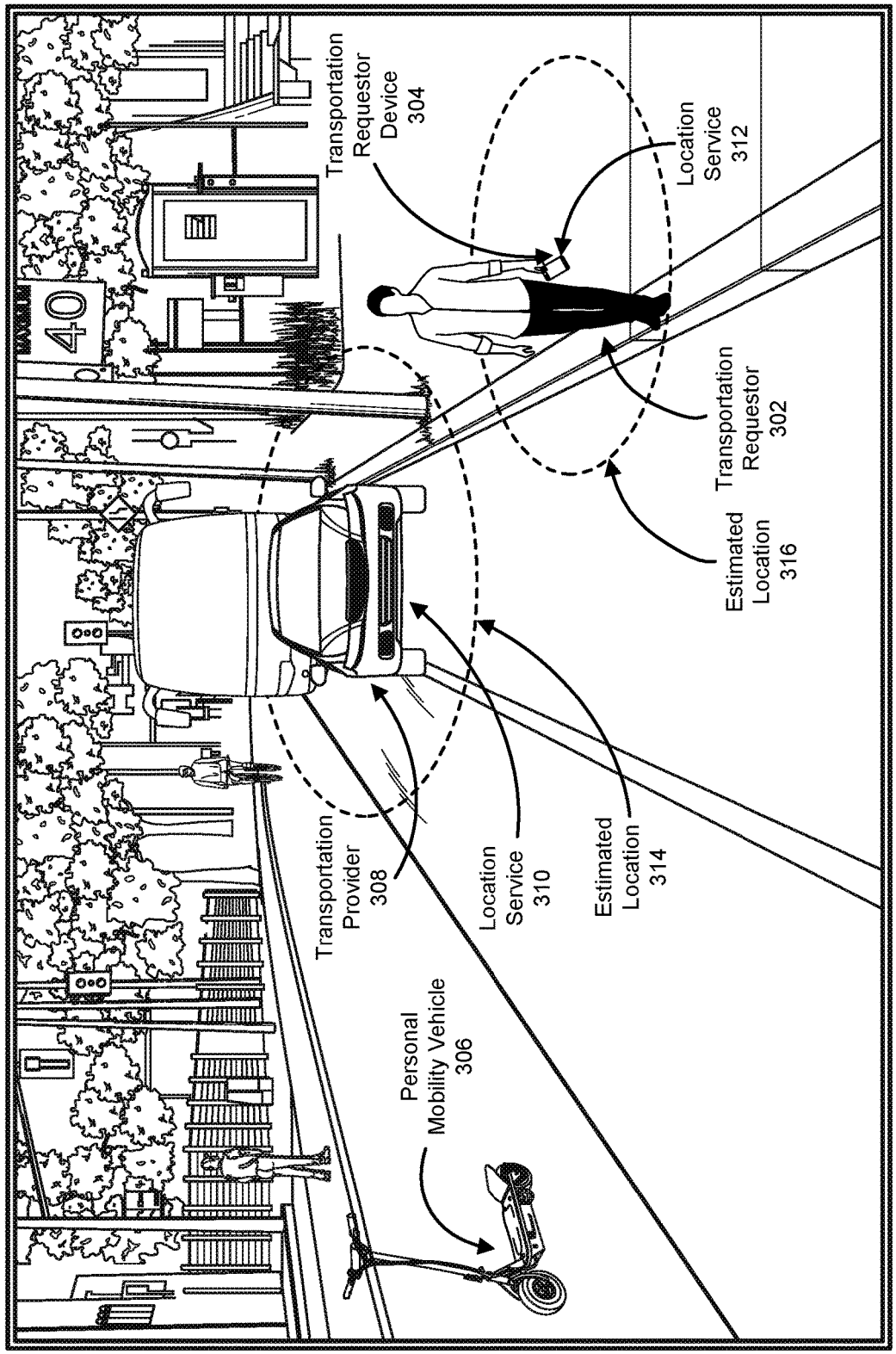
FIG. 3 is an illustration of an example transportation requestor and personal mobility vehicle.

FIG. 3 illustrates an example transportation requestor 302 with a transportation requestor device 304 leaving a PMV 306. In some examples, transportation requestor 302 may be meeting a transportation provider 308. In one embodiment, transportation requestor device 304 may be configured with location service 312. In one embodiment, location service 312 may include a global positioning system (GPS), a signal triangulation system, a simultaneous location and mapping system, an image feature identification system, a wireless network identifier-based system, and/or any other appropriate type of localization system and/or service. In one embodiment, location service 312 may provide an estimated location 316 of transportation requestor device 304 that includes a range of potential locations. In other embodiments, location services 312 may provide an exact location of transportation requestor device 304. In some examples, the systems described herein may determine, based on location data from location service 312, that transportation requestor 302 is no longer co-located with PMV 306 and is therefore not currently using PMV 306. Additionally or alternatively, transportation provider 308 may be configured with a location service 310. In one embodiment, location service 310 may provide an estimated location 314 of transportation provider 308. In some examples, location service 310 may be part of a vehicle represented by transportation provider 308, part of a device operated by an operator of transportation provider 308, and/or part of a device operated by an additional transportation requestor currently being transported by transportation provider 308. In one embodiment, the systems described herein may determine, based on location data from location service 310 and/or information that indicates that transportation requestor 302 is being transported by transportation provider 308, that transportation requestor 302 is not currently using PMV 306. For example, the systems described herein may calculate a distance between estimated location 314 and estimated location 316. In some embodiments, the systems described herein may compare location data from location service 310 and/or location service 312 with location data from a location service that is part of PMV 306. Additionally or alternatively, the systems described herein may compare location data from location service 310 and/or location service 312 with location data from a known docking station of PMV 306 and/or location data about PMV 306 gathered in another manner.

Figure 4:
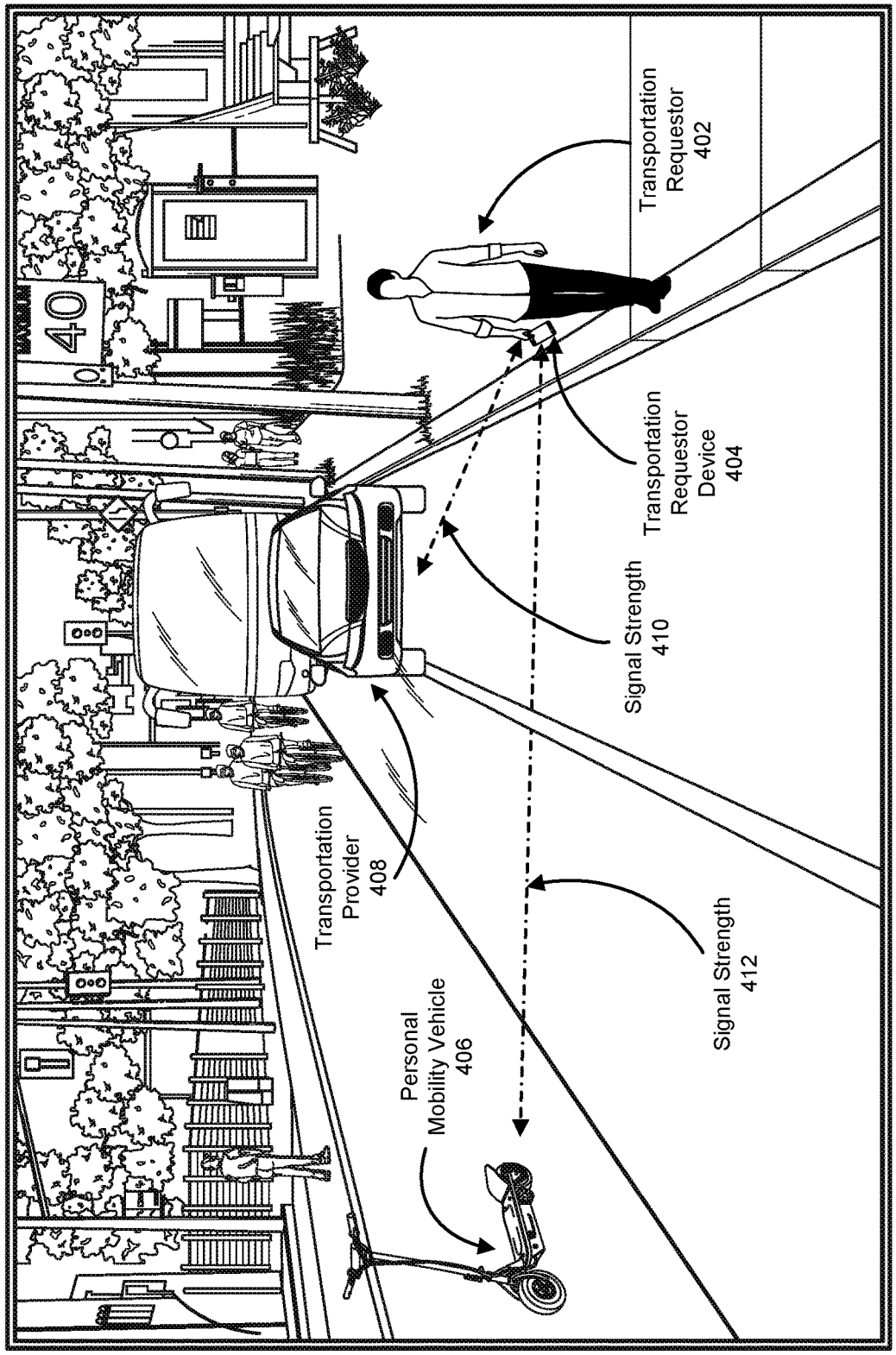
FIG. 4 is an illustration of an example transportation requestor and personal mobility vehicle.

FIG. 4 illustrates an example transportation requestor 402 with a transportation requestor device 404 leaving a PMV 406. In some examples, transportation requestor 402 may be meeting a transportation provider 408. In some embodiments, the systems described herein may determine, based on a signal strength 412 between transportation requestor device 404 and PMV 406, that transportation requestor 402 is not currently using PMV 406. For example, the systems described herein may determine that if signal strength 412 is below a certain threshold, transportation requestor device 404 has a high probability of being at least a certain distance away from PMV 406. Additionally or alternatively, the systems described herein may determine, based on a signal strength 410 between transportation requestor device 404 and transportation provider 408, that transportation requestor 402 is not currently using PMV 406. For example, the systems described herein may determine that if signal strength 410 is above a certain threshold, transportation requestor device 404 has a high probability of being within a certain distance of and/or being currently transported by transportation provider 408 and thus may no longer be using PMV 406. In some examples, signal strength 410 and/or 412 may represent various ways of measuring the strength of various types of signal, including but not limited to wireless signal, near field communication signal, and/or BLUETOOTH signal. In some embodiments, the systems described herein may use signal strength from devices and/or vehicles not directly associated with the transportation requestor. For example, as a different vehicle associated with the dynamic transportation network travels past PMV 406 and/or transportation requestor 402 (e.g., fulfilling a transportation request unrelated to PMV 406 and/or transportation requestor 402), the different vehicle may detect a wireless signal from PMV 406 and/or transportation requestor device 404 and provide information about the detected wireless signal to a dynamic transportation management system. The dynamic transportation management system may then determine, based on the information about the detected wireless signal and information about the position of the different vehicle when the wireless signal was detected, the location of PMV 406 and/or transportation requestor 402. In another embodiment, rather than sending the information to the dynamic transportation management system, transportation requestor device 404 and/or PMV 406 may perform the calculations to determine the location of PMV 406 and/or transportation requestor 402.

Figure 5:
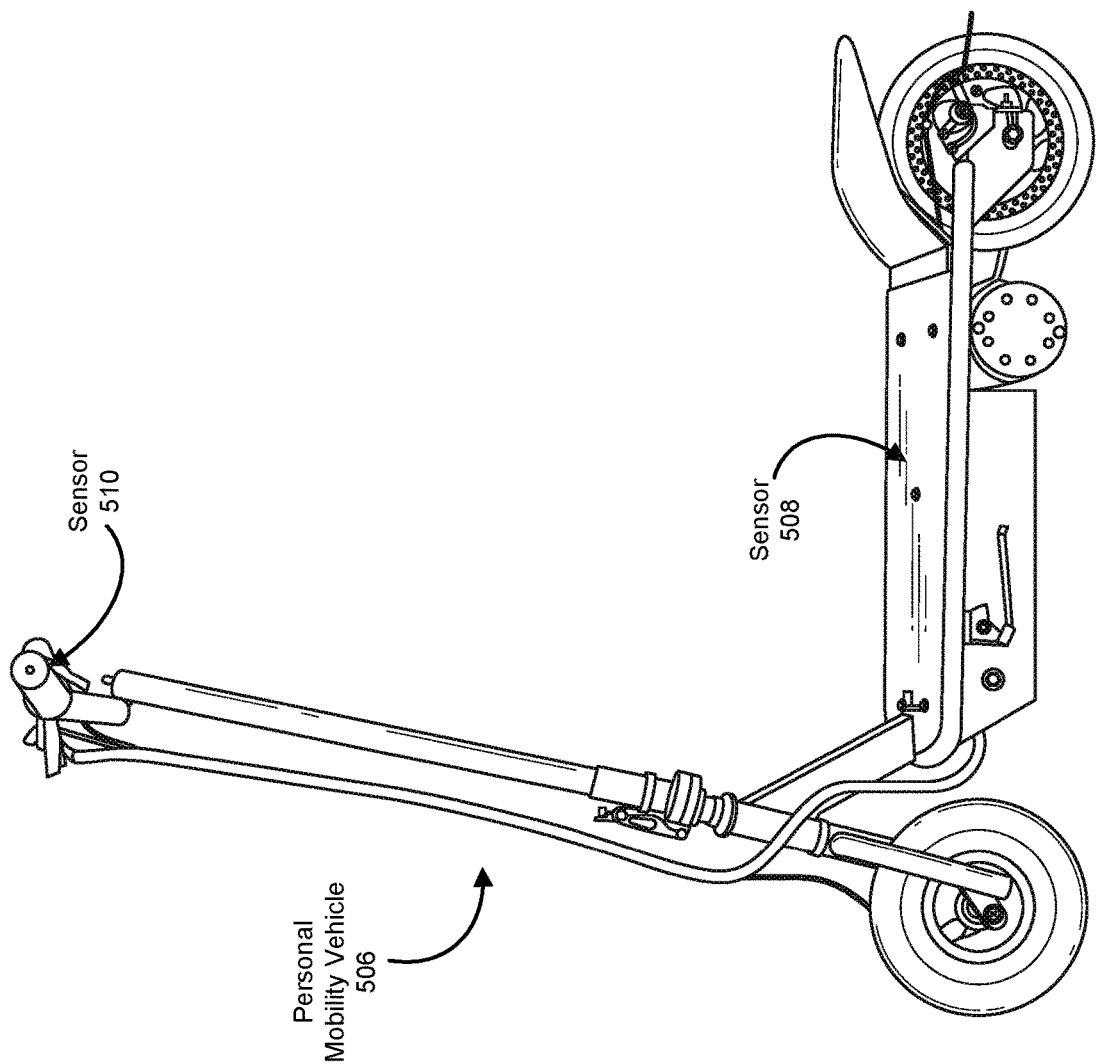
FIG. 5 is an illustration of an example transportation requestor and personal mobility vehicle.

FIG. 5 illustrates an example PMV 506. In some embodiments, PMV 506 may have a sensor 508 and/or a sensor 510. In one embodiment, sensor 508 may detect weight and/or strain on PMV 506. In some examples, the systems described herein may determine, based on the lack of weight on PMV 506 detected by sensor 508, that transportation requestor 502 is not currently using PMV 506. In some embodiments, sensor 510 may detect pressure on the handlebars of PMV 506. In some examples, the systems described herein may determine, based on the lack of pressure on the handlebars of PMV 506 detected by sensor 510, that a transportation requestor is not currently using PMV 506. Additionally or alternatively, sensor 510 may detect biometric information such as heartbeat and/or fingerprints. In some examples, the systems described herein may determine that a transportation requestor is no longer using PMV 506 because sensor 510 cannot currently detect a heartbeat nearby. In another example, the systems described herein may determine that a specific transportation requestor is not currently using PMV 506 because fingerprints that match that specific transportation requestor are not currently registering on sensor 510. In some embodiments, sensor 510 may record still images and/or video and the systems described herein may determine the current usage state of PMV 506 based on the images and/or video. Additionally or alternatively, sensor 508 and/or 510 may detect the orientation and/or position of PMV 506. For example, the systems described herein may determine that PMV 506 is not currently in use based on sensor 508 and/or 510 detecting that PMV 506 is in a horizontal orientation (e.g., tipped over).

In some embodiments, sensor 508 and/or sensor 510 may detect a physical locked state of PMV 506. For example, sensor 508 and/or sensor 510 may detect that a physical locking mechanism of PMV 506 is engaged to prevent one or more wheels of PMV 506 from rotating and/or to physically attach PMV 506 to an immobile object (e.g., a docking station and/or a bike rack). In some embodiments, physical locking mechanisms of PMV 506 may automatically engage in certain situations. For example, a physical locking mechanism may lock PMV 506 to a docking station when the physical locking mechanism detects contact with the docking station. Additionally or alternatively, sensor 508 and/or sensor 510 may include sensors that detect the state of a kickstand, sensors that receive data from a rear-facing camera and/or radio-frequency camera, and/or any other suitable sensors for detecting the presence of a rider.

Figure 6:
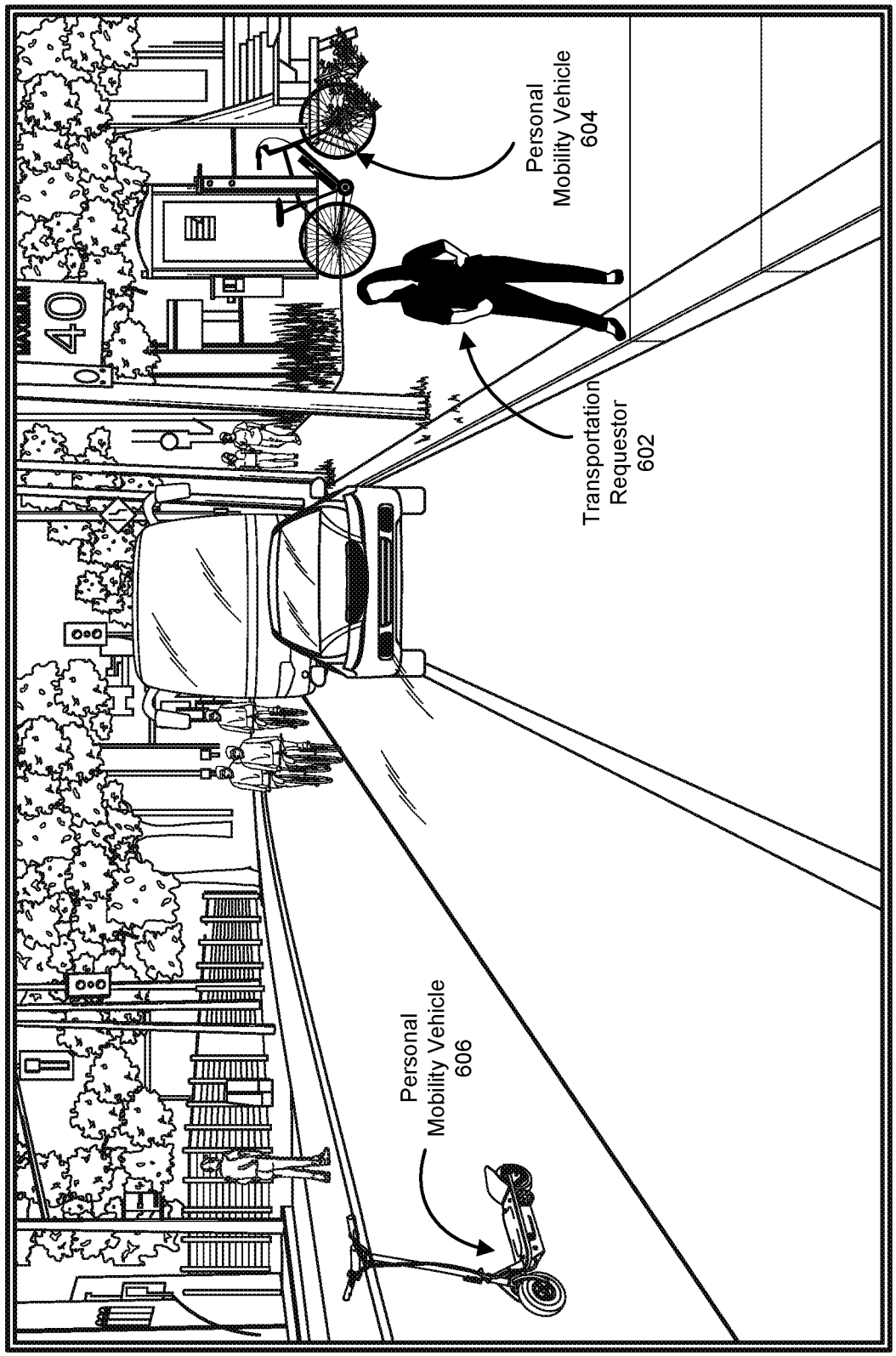
FIG. 6 is an illustration of an example transfer between two personal mobility vehicles.

FIG. 6 illustrates an example transfer between two personal mobility vehicles. In one example, a transportation requestor 602 may transfer from a PMV 606 to a PMV 604. A transportation requestor may transfer between PMVs in a variety of circumstances. For example, a transportation requestor may transfer from a PMV that is running low on battery and/or fuel to a PMV that is fully charged. In another example, a transportation requestor may transfer from a PMV that is unpowered to a PMV that is powered before traversing difficult terrain (e.g., a steep incline). Additionally or alternatively, the dynamic transportation matching system may incentive a transportation requestor to transfer from a PMV with multiple seats, such as a tandem bicycle, to a PMV with a single seat in order to increase the number of available seats on PMVs. In some embodiments, the systems described herein may update the status of PMV 606 based on a change in the usage and/or status of PMV 604. For example, when transportation requestor 602 begins using PMV 604, the systems described herein may deallocate PMV 606 from transportation requestor 602. In some examples, the term "deallocate," as used herein, may refer to ceasing to accrue PMV usage time to a transportation requestor's account, ceasing to hold a transportation requestor responsible for a PMV, and/or ceasing make a PMV available to a transportation requestor for use. Additionally or alternatively, the systems described herein may update the status of PMV 604 based on the change in usage and/or status of PMV 606. For example, the systems described herein may unlock PMV 604 in response to determining that PMV 606 is no longer in use by transportation requestor 602.

Figure 7:
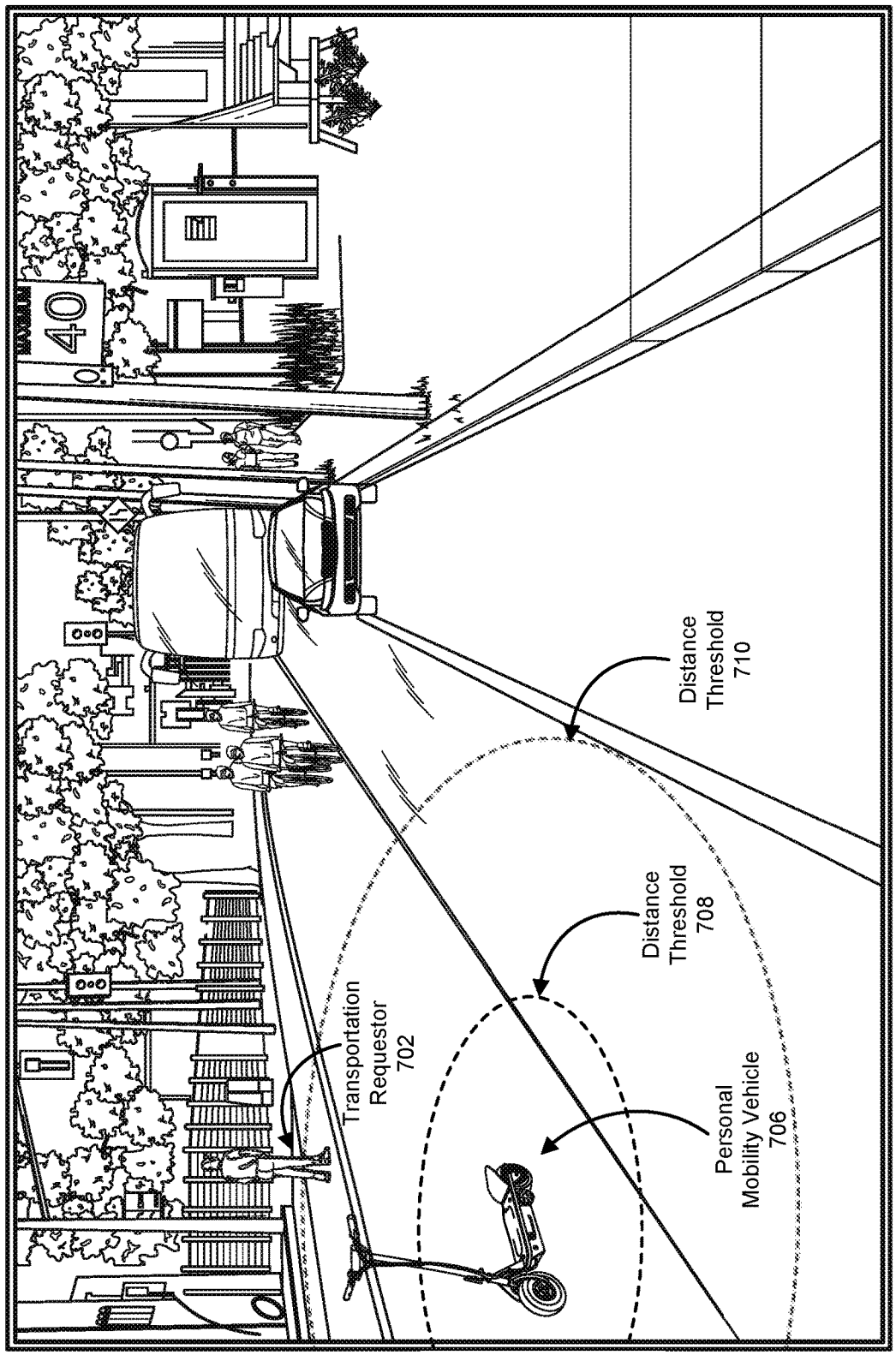
FIG. 7 is an illustration of an example personal mobility vehicle.

FIG. 7 illustrates example distance thresholds from a PMV 706. In some embodiments, the systems described herein may use various numbers of distance thresholds as triggers for different activities, such as one threshold, two thresholds, three thresholds, or more. Examples of distance thresholds may include, without limitation, 5 feet, 10 feet, 15 feet, 30 feet, and/or 50 feet. In some embodiments, if transportation requestor 702 is within distance threshold 708, the systems described herein may determine that transportation requestor 702 is currently using PMV 706 and may not change the status of PMV 706. For example, transportation requestor 702 may be riding PMV 706 or may have briefly stepped off PMV 706 but may still have custody of PMV 706 and plan to resume using PMV 706. In other embodiments, if transportation requestor 702 is within distance threshold 708 but not currently riding PMV 706 (e.g., as detected by sensors), the systems described herein may update the status of PMV 706. For example, the systems described herein may update the locked status of PMV 706 from unlocked to locked and/or may physically lock PMV 706 but may not necessarily update the allocation status of PMV to deallocate PMV 706 from transportation requestor 702 until after a predetermined amount of time has passed and/or transportation requestor 702 has passed an additional distance threshold.

In some examples, if PMV 706 is locked but currently allocated to transportation requestor 702, the systems described herein may automatically unlock PMV 706 if the systems described herein detect that transportation requestor 702 is once again within distance threshold 708. Additionally or alternatively, the systems described herein may enable transportation requestor 702 to override automatic locking/unlocking based on distance thresholds by sending a message to the dynamic transportation network requesting that PMV 706 be locked, unlocked, and/or deallocated. In one embodiment, the systems described herein may not deallocate PMV 706 after transportation requestor 702 has passed an additional distance threshold if transportation requestor 702 has reserved PMV 706 for a trip that has not yet been completed (e.g., transportation requestor 702 has paused partway along the route to the planned trip destination). In some embodiments, the systems described herein may send a message to a transportation requestor device associated with transportation requestor 702 if PMV 706 is on the verge of being deallocated and/or unlocked due to time, distance, and/or any other factors. In some examples, the systems described herein may enable transportation requestor 702 to reply to the message to extend the time that PMV 706 remains locked and/or allocated. In some embodiments, the systems described herein may automatically deallocate and/or unlock and locked and allocated PMV after a maximum period of time has passed during which the PMV is locked and allocated to transportation requestor 702.

In some embodiments, the systems described herein may update the state of a PMV based on multiple distance thresholds. For example, if transportation requestor 702 passes distance threshold 708, the systems described herein may lock but not deallocate PMV 706. In this example, if transportation requestor 702 then passes distance threshold 710, the systems described herein may deallocate PMV 706 from transportation requestor 702 and/or update a status indicator of PMV 706 to indicate that PMV 706 is available to other transportation requestors. In one embodiment, the systems described herein may, in response to transportation requestor 702 passing distance threshold 708, send a message to a transportation requestor device operated by transportation requestor 702 notifying transportation requestor 702 that PMV 706 will be deallocated from transportation requestor 702 if transportation requestor 702 does not return within a specified timespan and/or continues moving further away from PMV 706.

In some examples, rather than marking PMV 706 as available, the systems described herein may change the status of PMV 706 to some other appropriate status, such as low on fuel and/or battery, in need of maintenance, locked and/or reserved awaiting a specific additional transportation requestor who is expected to arrive shortly, locked but not available, offline, out of service, tipped over, in need of repositioning, lost but reporting (e.g., still connected to the dynamic transportation matching system but cannot be physically located), and lost and not reporting (e.g., no longer connected to the dynamic transportation matching system), out of zone, damaged, undergoing maintenance, undergoing repair, and/or any other appropriate status or combination of statuses.

Figure 8:
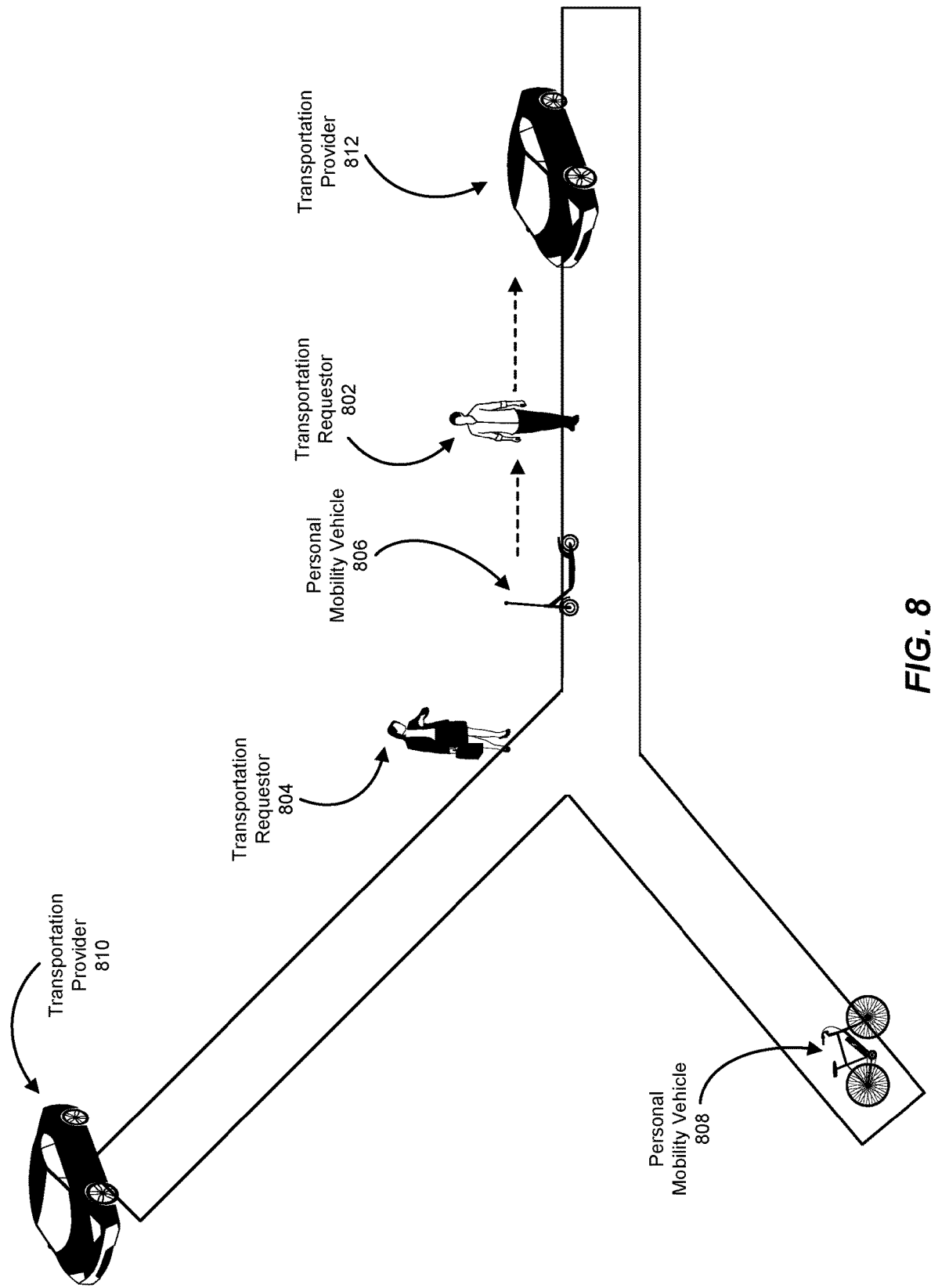
FIG. 8 is an illustration of an example set of transportation requestors, transportation providers, and personal mobility vehicles.

FIG. 8 illustrates an example set of transportation requestors, transportation providers, and PMVs. In one example, a transportation requestor 802 may transfer from a PMV 806 to a transportation provider 812. In some examples, a transportation requestor 804 may make a request for transportation via the dynamic transportation network. In one example, if PMV 806 is not marked as available, the dynamic transportation matching system may direct transportation requestor to PMV 808, which is farther away, and/or may direct transportation provider 810 to divert from a planned route to meet transportation requestor 804. However, if PMV 806 is marked as available, the dynamic transportation matching system may direct transportation requestor 804 to use PMV 806 to meet transportation provider 810 along the planned route of transportation provider 810, improving efficiency and reducing trip time for both transportation requestor 804 and transportation provider 810. By automatically updating the status of personal mobility vehicles without requiring user intervention, the systems and methods described herein may improve the availability of personal mobility vehicles, improving the responsiveness of the dynamic transportation network and the efficiency of trips taken using the dynamic transportation network.

Figure 9:
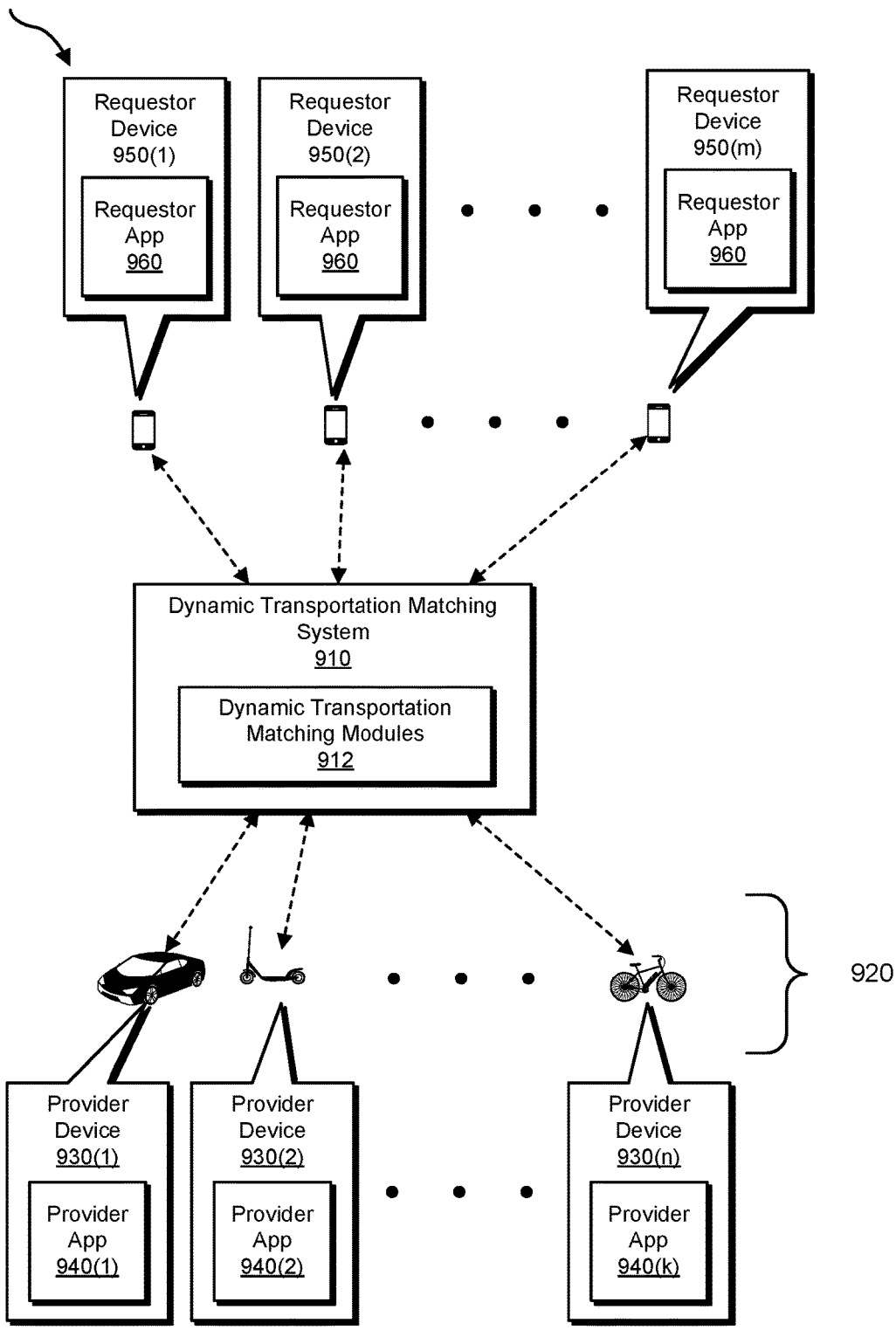
FIG. 9 is a block diagram of an example system for determining allocation of personal mobility vehicles.

FIG. 9 illustrates an example system 900 for matching transportation requests with a dynamic transportation network that includes personal mobility vehicles. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include road-going vehicles and personal mobility vehicles. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 2 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include and/or be provisioned with provider devices 930(1)-(n) (e.g., whether integrated into the vehicle, permanently affixed to the vehicle, temporarily affixed to the vehicle, worn by a driver of the vehicle, etc.). In some examples, provider devices 930 may include provider apps 940(1)-(k). Provider apps 940(1)-(k) may represent any application, program, and/or module that may provide one or more services related to operating a vehicle and/or providing transportation matching services. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider apps 940(1)-(k) may include a transportation matching application for providers and/or one or more applications for matching PMVs with requestor devices. In some examples, one or more of provider applications 940(1)-(k) may match the user of a provider app 940(1)-(k) (e.g., a transportation provider) with transportation requestors through communication with dynamic transportation matching system 910. Additionally or alternatively, one or more of provider applications 940(1)-(k) may match a PMV with transportation requestors through communication with dynamic transportation matching system 910. In addition, and as is described in greater detail below, provider apps 940(1)-(k) may provide dynamic transportation management system 910 with information about a provider and/or vehicle (including, e.g., the current location of the provider and/or vehicle) to enable dynamic transportation management system 910 to provide dynamic transportation matching and/or management services for the provider and/or vehicle and one or more requestors. In some examples, provider apps 940(1)-(k) may coordinate communications and/or a payment between a requestor and a provider. According to some embodiments, provider apps 940(1)-(k) may provide a map service, a navigation service, a traffic notification service, and/or a geolocation service.

Additionally, as shown in FIG. 9, dynamic transportation matching system 910 may communicate with requestor devices 950(1)-(m). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 10:
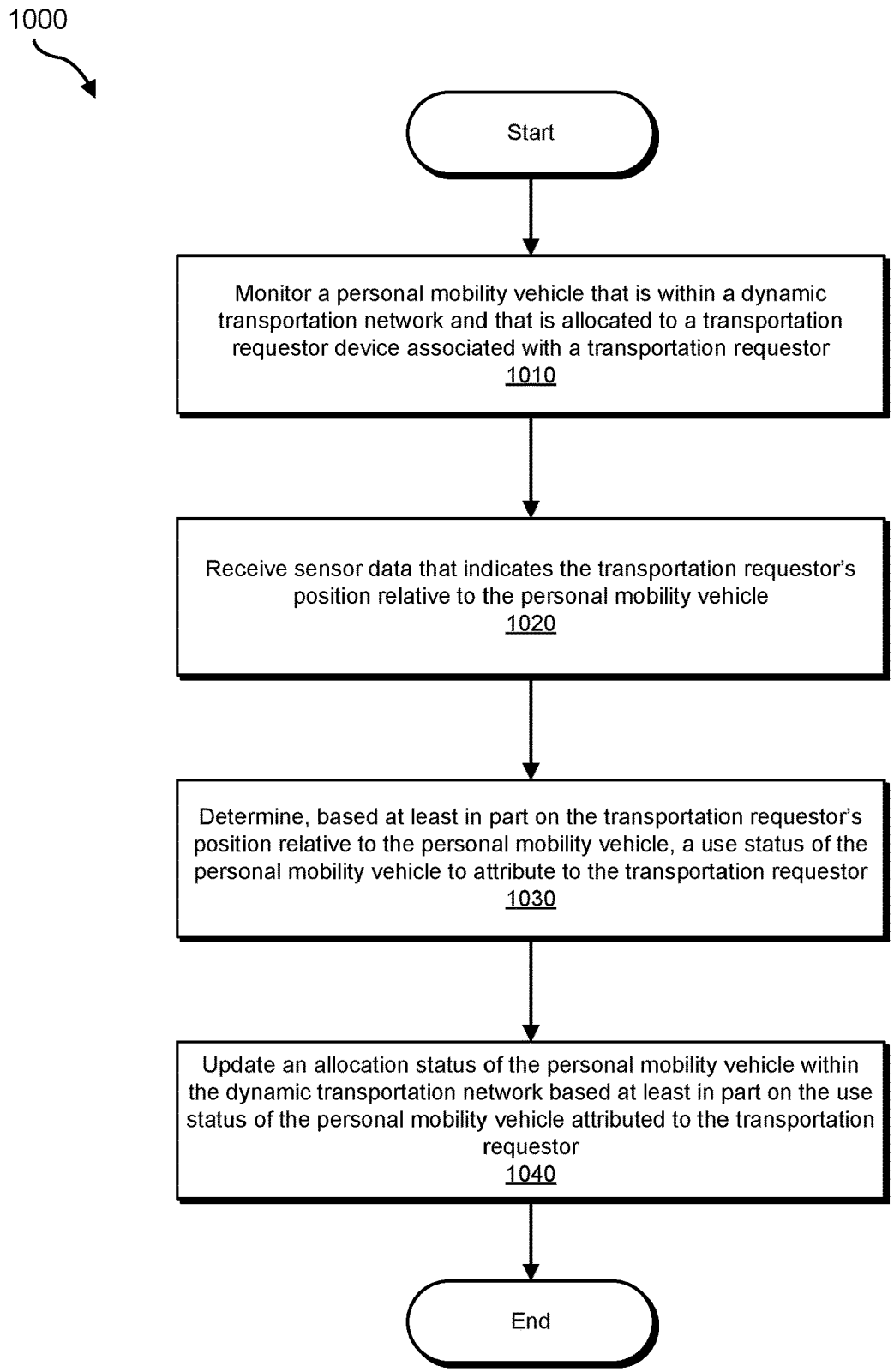
FIG. 10 is a flow diagram of an example method for determining allocation of personal mobility vehicles.

FIG. 10 illustrates an example method 1000 for determining allocation of personal mobility vehicles. As illustrated in FIG. 10, at step 1010, one or more of the systems described herein may determine that a personal mobility vehicle that is associated with a dynamic transportation network is allocated to a transportation requestor device associated with a transportation requestor.

At step 1020, one or more of the systems described herein may receive sensor data that indicates the transportation requestor's position relative to the personal mobility vehicle.

In some examples, the systems described herein may receive the sensor data that indicates the transportation requestor's position relative to the personal mobility vehicle by receiving sensor data from the transportation requestor device. In some examples, the systems described herein may receive the sensor data that indicates the transportation requestor's position relative to the personal mobility vehicle by receiving sensor data from a transportation provider device matched with the transportation requestor device. Additionally or alternatively, the systems described herein may receive the sensor data that indicates the transportation requestor's position relative to the personal mobility vehicle by receiving sensor data from the personal mobility vehicle.

In some examples, the systems described herein may receive the sensor data that indicates the transportation requestor's position relative to the personal mobility vehicle by receiving data that indicates a geolocation of the transportation requestor. Additionally or alternatively, the systems described herein may receive the sensor data that indicates the transportation requestor's position relative to the personal mobility vehicle by receiving biometric data about the transportation requestor. In some examples, the systems described herein may receive the sensor data that indicates the transportation requestor's position relative to the personal mobility vehicle by receiving signal strength data about the transportation requestor device.

At step 1030, one or more of the systems described herein may determine, based at least in part on the transportation requestor's position relative to the personal mobility vehicle, a use status of the personal mobility vehicle.

At step 1040, one or more of the systems described herein may update an allocation status of the personal mobility vehicle associated with the dynamic transportation network based at least in part on the use status of the personal mobility vehicle attributed to the transportation requestor.

In some examples, the systems described herein may update the allocation status of the personal mobility vehicle by locking the personal mobility vehicle to prevent operation. In one embodiment, the systems described herein may receive updated sensor data that indicates the transportation requestor's updated position relative to the personal mobility vehicle is closer to the personal mobility vehicle than the transportation requestor's position that was previously determined, determine, based at least in part on the transportation requestor's position updated relative to the personal mobility vehicle, an updated use status of the personal mobility vehicle that reflects that the transportation requestor is currently using the personal mobility vehicle, and update the allocation status of the personal mobility vehicle associated with the dynamic transportation network by unlocking the personal mobility vehicle to enable operation based at least in part on the updated use status. Additionally or alternatively, the systems described herein may receive a message from the transportation requestor device that indicates an updated use status of the personal mobility vehicle and update the allocation status of the personal mobility vehicle associated with the dynamic transportation network by unlocking the personal mobility vehicle to enable operation based at least in part on the updated use status.

In some examples, the systems described herein may update the allocation status of the personal mobility vehicle by deallocating the personal mobility vehicle from the transportation requestor device. In some examples, systems described herein may update the allocation status of the personal mobility vehicle by allocating the personal mobility vehicle to an additional transportation requestor device based at least in part on updating the allocation status of the personal mobility vehicle associated with the dynamic transportation network.

In some embodiments, the systems described herein may update the allocation status of the personal mobility vehicle by updating the allocation status of the personal mobility vehicle in response to determining that the transportation requestor has exceeded a predetermined threshold for distance from the personal mobility vehicle. In some examples, the systems described herein may update the allocation status of the personal mobility vehicle by sending a notification to the transportation requestor device about the allocation status of the personal mobility vehicle. In some examples, the systems described herein may update the allocation status of the personal mobility vehicle associated with the dynamic transportation network by designating the personal mobility vehicle as available to additional transportation requestors.

Figure 11:
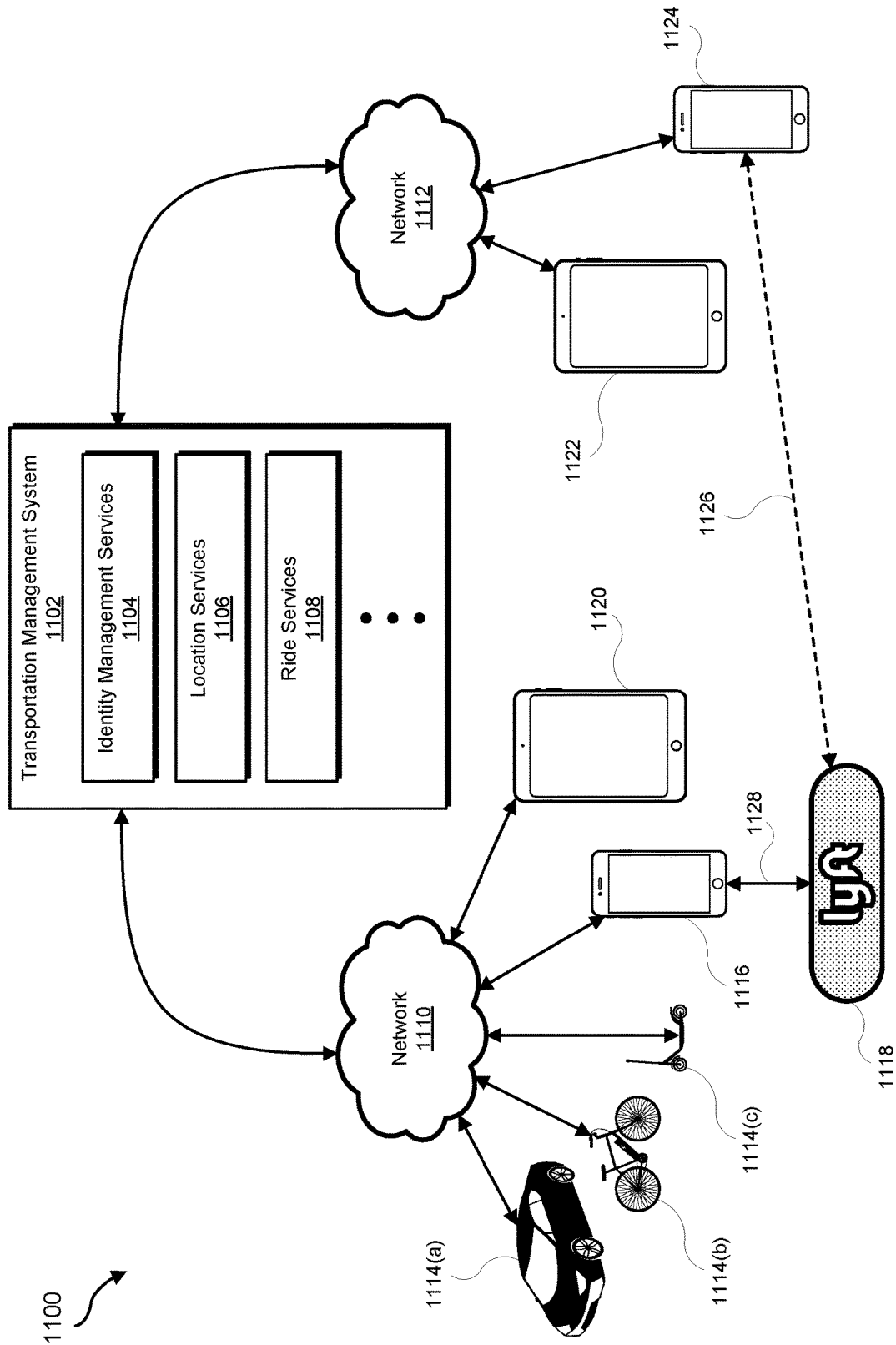
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(a), 1114(b), and/or 1114(c); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services module 1104 has authenticated the identity a ride requestor, ride services module 1108 may attempt to match the requestor with one or more ride providers. In some embodiments, ride services module 1108 may identify an appropriate provider using location data obtained from location services module 1106. Ride services module 1108 may use the location data to identify providers who are geographically close to the requestor (e.g., within a certain threshold distance or travel time) and/or who are otherwise a good match with the requestor. Ride services module 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
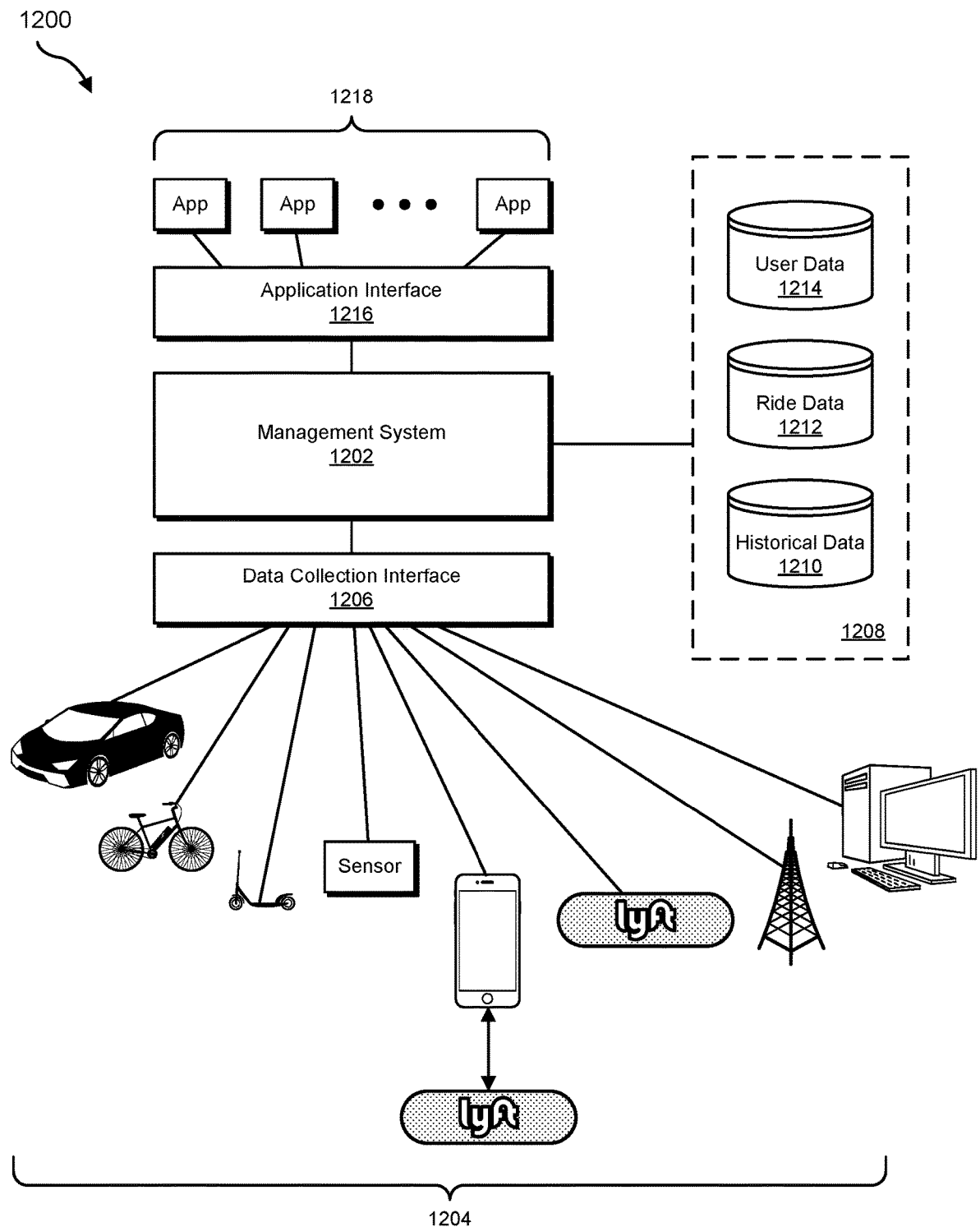
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining, by a computing system associated with a dynamic transportation network, that a personal mobility vehicle associated with the dynamic transportation network is allocated to a transportation requestor device associated with a transportation requestor;
   receiving, by the computing system associated with the dynamic transportation network, information indicating a distance between the transportation requestor and the personal mobility vehicle, wherein the distance is determined based at least in part on a signal strength between the transportation requestor device and the personal mobility vehicle and a wireless signal associated with a transportation provider device matched with the transportation requestor device;
   determining, by the computing system associated with the dynamic transportation network, based at least in part on the information indicating the distance between the transportation requestor and the personal mobility vehicle, a use status of the personal mobility vehicle; and
   automatically updating, by the computing system associated with the dynamic transportation network, an allocation status of the personal mobility vehicle associated with the dynamic transportation network based at least in part on the use status of the personal mobility vehicle allocated to the transportation requestor device without active intervention from the transportation requestor,
   wherein updating the allocation status of the personal mobility vehicle comprises sending a signal, by the computing system associated with the dynamic transportation network via a wireless network, to instruct the personal mobility vehicle to automatically lock the personal mobility vehicle, by a locking mechanism of the personal mobility vehicle, to prevent operation in response to determining that the signal strength between the transportation requestor device and the personal mobility vehicle is below a predetermined threshold.

2. The computer-implemented method of claim 1, further comprising updating the allocation status of the personal mobility vehicle by allocating the personal mobility vehicle to a different transportation requestor device based at least in part on updating the allocation status of the personal mobility vehicle associated with the dynamic transportation network.

3. The computer-implemented method of claim 1, wherein receiving the information indicating the distance between the transportation requestor and the personal mobility vehicle comprises receiving information from the transportation requestor device.

4. The computer-implemented method of claim 1, wherein receiving the information indicating the distance between the transportation requestor and the personal mobility vehicle comprises receiving information from the transportation provider device matched with the transportation requestor device.

5. The computer-implemented method of claim 1, wherein receiving the information indicating the distance between the transportation requestor and the personal mobility vehicle comprises receiving information from the personal mobility vehicle.

6. The computer-implemented method of claim 1, further comprising:
   receiving updated information indicating an updated distance between the transportation requestor and the personal mobility vehicle is smaller than the distance that was previously determined;
   determining, based at least in part on the updated information indicating the updated distance between the transportation requestor and the personal mobility vehicle, an updated use status of the personal mobility vehicle that reflects that the transportation requestor is currently using the personal mobility vehicle; and
   updating the allocation status of the personal mobility vehicle associated with the dynamic transportation network by unlocking the personal mobility vehicle to enable operation based at least in part on the updated use status.

7. The computer-implemented method of claim 1, further comprising:
   receiving a message from the transportation requestor device that indicates an updated use status of the personal mobility vehicle; and
   updating the allocation status of the personal mobility vehicle associated with the dynamic transportation network by unlocking the personal mobility vehicle to enable operation based at least in part on the updated use status.

8. The computer-implemented method of claim 1, wherein updating the allocation status of the personal mobility vehicle comprises deallocating the personal mobility vehicle from the transportation requestor device.

9. The computer-implemented method of claim 1, wherein updating the allocation status of the personal mobility vehicle comprises sending a notification to the transportation requestor device about the allocation status of the personal mobility vehicle.

10. The computer-implemented method of claim 1, wherein receiving the information indicating the distance between the transportation requestor and the personal mobility vehicle comprises receiving information that indicates a geolocation of the transportation requestor.

11. The computer-implemented method of claim 1, wherein receiving the information indicating the distance between the transportation requestor and the personal mobility vehicle comprises receiving biometric information about the transportation requestor.

12. The computer-implemented method of claim 1, wherein updating the allocation status of the personal mobility vehicle associated with the dynamic transportation network comprises designating the personal mobility vehicle as available to additional transportation requestors.

13. The computer-implemented method of claim 1, further comprising determining a signal strength between the transportation requestor device and the transportation provider device matched with the transportation requestor device based on the wireless signal associated with the transportation provider device matched with the transportation requestor device.

14. The computer-implemented method of claim 13, wherein updating the allocation status of the personal mobility vehicle comprises locking the personal mobility vehicle to prevent operation in response to determining that the signal strength between the transportation requestor device and the transportation provider device is above a predetermined threshold.

15. The computer-implemented method of claim 1, wherein the wireless signal associated with the transportation provider device matched with the transportation requestor device indicates a distance between the transportation requestor and the transportation provider device.

16. A system comprising:
   an allocation determination module, stored in memory, that determines that a personal mobility vehicle that is associated with a dynamic transportation network is allocated to a transportation requestor device associated with a transportation requestor;
   a receiving module, stored in memory, that receives information indicating a distance between the transportation requestor and the personal mobility vehicle, wherein the distance is determined based at least in part on a signal strength between the transportation requestor device and the personal mobility vehicle and a wireless signal associated with a transportation provider device matched with the transportation requestor device;
   a use status determination module, stored in memory, that determines, based at least in part on the information indicating the distance between the transportation requestor and the personal mobility vehicle, a use status of the personal mobility vehicle;
   an update module, stored in memory, that automatically updates an allocation status of the personal mobility vehicle associated with the dynamic transportation network based at least in part on the use status of the personal mobility vehicle allocated to the transportation requestor device without active intervention from the transportation requestor, wherein updating the allocation status of the personal mobility vehicle comprises sending a signal, via a wireless network, to instruct the personal mobility vehicle to automatically lock the personal mobility vehicle, by a locking mechanism of the personal mobility vehicle, to prevent operation in response to determining that the signal strength between the transportation requestor device and the personal mobility vehicle is below a predetermined threshold; and
   at least one physical processor that executes the allocation determination module, the receiving module, the use status determination module, and the update module.

17. The system of claim 16, wherein the receiving module receives the information indicating the distance between the transportation requestor and the personal mobility vehicle by receiving information from the transportation requestor device.

18. The system of claim 16, wherein the receiving module receives the information indicating the distance between the transportation requestor and the personal mobility vehicle by receiving information from the transportation provider device matched with the transportation requestor device.

19. The system of claim 16, wherein the receiving module receives the information indicating the distance between the transportation requestor and the personal mobility vehicle by receiving information from the personal mobility vehicle.

20. A computer-readable non-transitory medium comprising:
   computer-readable instructions that, when executed by at least one processor of a computing device, cause the computing device to:
      determine that a personal mobility vehicle that is associated with a dynamic transportation network is allocated to a transportation requestor device associated with a transportation requestor;
      receive information indicating a distance between the transportation requestor and the personal mobility vehicle, wherein the distance is determined based at least in part on a signal strength between the transportation requestor device and the personal mobility vehicle and a wireless signal associated with a transportation provider device matched with the transportation requestor device;
      determine, based at least in part on the information indicating the distance between the transportation requestor and the personal mobility vehicle, a use status of the personal mobility vehicle; and
      automatically update an allocation status of the personal mobility vehicle associated with the dynamic transportation network based at least in part on the use status of the personal mobility vehicle allocated to the transportation requestor device without active intervention from the transportation requestor,
   wherein updating the allocation status of the personal mobility vehicle comprises sending a signal, via a wireless network, to instruct the personal mobility vehicle to automatically lock the personal mobility vehicle, by a locking mechanism of the personal mobility vehicle, to prevent operation in response to determining that the signal strength between the transportation requestor device and the personal mobility vehicle is below a predetermined threshold.

* * * * *